J. P. POOL.
PROCESS OF MAKING ICE AND GENERATING POWER.
APPLICATION FILED MAY 20, 1910.
989,044.
Patented Apr. 11, 1911.
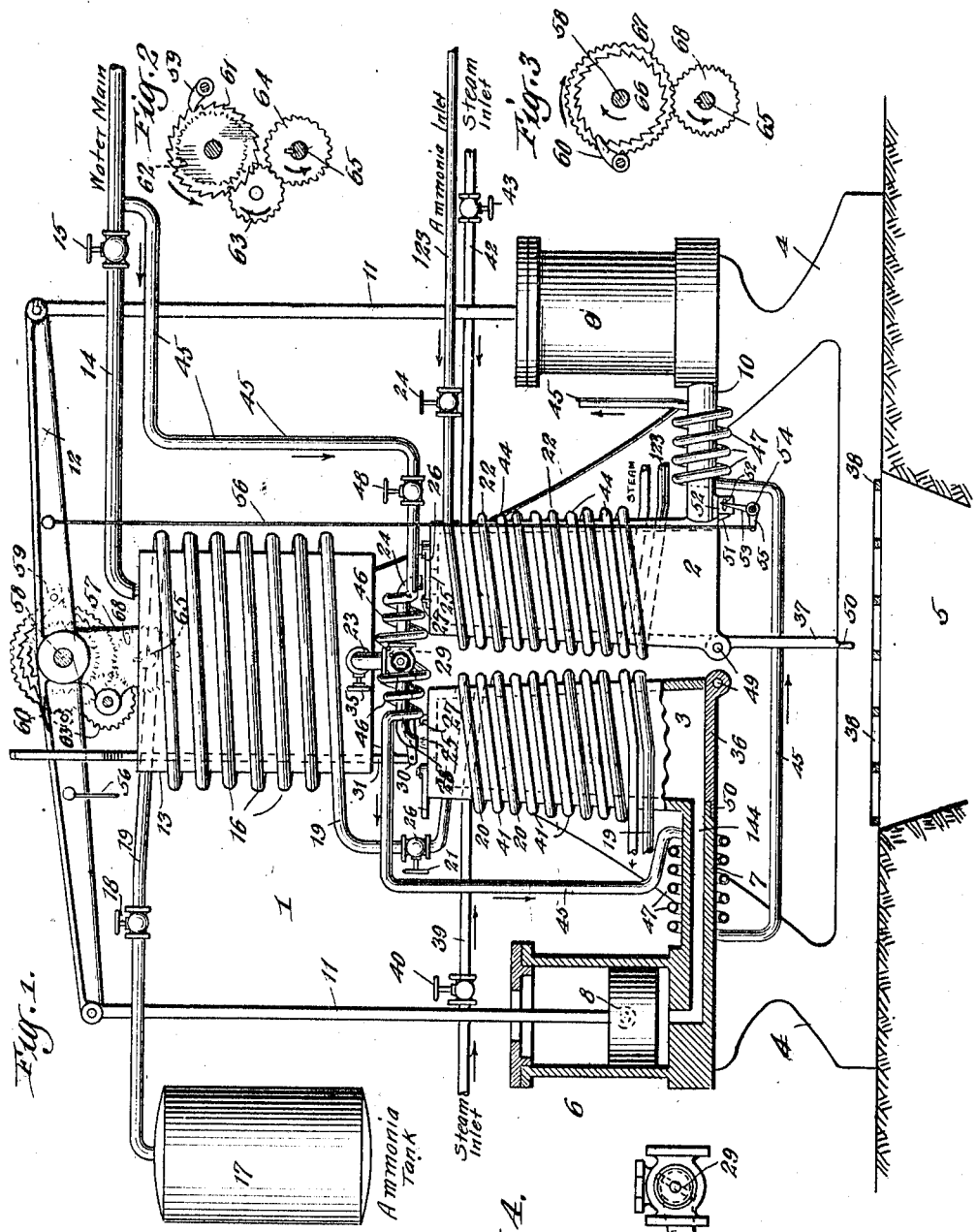
WITNESSES
INVENTOR
James P. Pool
BY
Alan M. Johnson
ATTORNEY

UNITED STATES PATENT OFFICE.

JAMES P. POOL, OF BROOKLYN, NEW YORK.

PROCESS OF MAKING ICE AND GENERATING POWER.

989,044.  Specification of Letters Patent.  Patented Apr. 11, 1911.

Application filed May 20, 1910. Serial No. 562,454.

*To all whom it may concern:*

Be it known that I, JAMES P. POOL, a citizen of the United States, and a resident of Brooklyn, in the county of Kings and State of New York, have invented certain new and useful Improvements in Processes of Making Ice and Generating Power, of which the following is a specification, taken in connection with the accompanying drawings, which form a part of the same.

This invention relates to freezing liquids and to transmit the energy of the expanding liquid, and make it do work. Various means may be used to accomplish this combined result, but for purposes of illustration I have shown in the drawings, somewhat diagrammatically, one manner of accomplishing this result whereby my invention can be carried out, though it is to be distinctly understood that it is not to be limited to this or any other particular form of mechanism. Usually the liquid to be frozen will be water so that the resulting ice can be sold commercially.

The accompanying drawing shows an illustrative embodiment of this invention in which the same reference numerals refer to similar parts in the several figures.

Figure 1 is a diagrammatic view partly in side elevation and partly in vertical section showing an apparatus for carrying out my invention; Fig. 2 is a detail side elevation of one of the transmission gears; Fig. 3 is a detail side elevation of another of the transmission gears; and Fig. 4 is a side elevation, partly in vertical section, and partly fragmentary, showing a detail.

In the illustrative embodiment of this invention shown in the drawing, 1 is an ice machine which for purposes of illustration I have shown consisting of two freezing tanks 2 and 3, though it is to be distinctly understood that one tank or a greater number may be used, if desired. These freezing tanks and the other mechanism are supported in any suitable manner such as by a frame or stand 4 which is preferably, though not necessarily, mounted over a pit 5. To each of the freezing tanks 2 and 3 I connect in any suitable manner, a cylinder so that the expansion of the water, or other freezing liquid, shall operate the plungers in the cylinders in a manner to be hereinafter more fully set forth.

To the freezing tank 3 I connect the cylinder 6 by means of a neck 7 so that the interior of the freezing tank 3 is in communication with that portion of the cylinder 6 which is or may be beneath the vertically movable piston 8. A similar cylinder 9 and neck 10 is connected to the freezing tank 2 and is also provided with a piston 8. To each of the pistons 8, 8 in each of the cylinders 6 and 9 is pivotally connected a pitman 11, the other end of these pitmen being pivotally connected, in the form of my invention illustrated, to a walking beam 12.

Mounted at any suitable height above the freezing tanks 2 and 3 I mount a reservoir 13 in which the liquid to be frozen is preliminarily chilled and preferably, if water, brought approximately to the temperature of 39-2/10 degrees, at which temperature it is approximately at its greatest density. The water or other liquid to be frozen is fed into this tank 13 in any suitable manner such as by means of a pipe 14 controlled by a valve 15. The water in the chilling tank or reservoir 13 may be brought to the proper temperature by any suitable means. By way of example I have shown coils 16, 16 from an ammonia tank 17 being led around the exterior of the tank 13 which, of course, may be properly jacketed and otherwise protected from radiation, all of which is omitted in the drawing, which as previously noted, is largely diagrammatic. The supply of the ammonia or other freezing liquid to the tank 13 is controlled by a suitable valve 18 in the pipe 19. This pipe 19 after being bent around the tank 13 to form the coil 16 is formed into suitable coils 20, 20 around the upper portion of the freezing tank 3. The passage of the ammonia through these coils 20, 20 is controlled by another valve 21. The end of the pipe 19 after making its last coil around the freezing tank 3 is led to a compression or any other suitable mechanism for re-using the ammonia (not shown). Around the other freezing tank 2 I form similar freezing coils 22, 22 preferably formed by bending the pipe 123 through which the ammonia or other freezing liquid is caused to flow controlled by a valve 24; the end of the pipe 123 being led to a compression or other suitable mechanism for re-using the ammonia or other freezing liquid (not shown).

In the form of my invention illustrated wherein I use two freezing tanks I connect to the bottom of the chilling tank or reservoir 13, in any suitable manner, a pipe 23 having two arms 24, 28 which respectively feed the liquid to be frozen into the freezing tanks 2 and 3. These tanks are formed of any suitable material preferably metal and are of sufficient rigidity to stand the high pressure of the water freezing. Their upper ends are almost closed except for the small openings 25, 25 shown in dotted lines in Fig. 1 through which the water from the pipes 24, 28 flow into the respective freezing tanks 2 and 3. These openings 25, 25 are preferably closed in any suitable manner as by pivoted covers 26, 26 which preferably, when in their closed position, take under lips 27, 27 formed on the top of the freezing tanks as shown more particularly on the freezing tank 2.

The flow of the liquid to be frozen from the reservoir 13 is controlled in any suitable manner so as to cut the flow of liquid off from the tank in which the liquid is being frozen and permit it to flow into the other freezing tank. By way of example I have shown a valve 29 for alternately changing the flow of the liquid from one arm 24 to the other corresponding arm 28 or vice versa. This valve may be operated by hand or it can be coupled up to be operated by a moving part of the mechanism. I have shown for example the valve 29 being provided with an arm 30 to which is pivotally connected a rod 31 (Fig. 4) having at its upper end two separated arms 32, 33 which form a fork and straddle the walking beam 12 as clearly shown in Figs. 1 and 4.

From the position of the parts as shown in Fig. 1, the liquid, which is ordinarily water, is caused to flow from the reservoir 13, through the arm 28 and into the freezing tank 3 until that tank is approximately full. The freezing liquid such as ammonia is then caused to travel through the coils 20, 20 located around the freezing tank 3, until the temperature of the water is brought to the freezing point. As the water begins to expand and freeze, pressure is exerted under the piston 8 and this piston is caused to rise in its cylinder 6 and rock the walking beam and bring it from the position shown in Fig. 1, where it contacts with the arm 32, into engagement with the other arm 33 when the further rocking of the walking beam will lift the rod 31 which in turn will cause the valve 29 to be swung over into its opposite position permitting the water to then flow through the arm 24 into the other freezing tank 2, which has been prepared for its reception. While I have shown this manner of automatically operating the valve 29, it may however be operated by hand when desired. I also preferably place another valve 35 in the pipe 23 to entirely cut off the liquid from both of the arms 24 and 28, when this is found necessary or expedient.

The freezing coil 20 together with the coils 22 upon the other tank 2 are preferably so located as to be some little distance above the bottom of the freezing tank, so as to permit the initial freezing at some little distance from the bottom of the tanks and the necks 7 and 10, respectively, which are connected to the respective freezing tanks 3 and 2. This permits the freezing of the ice in all portions of the freezing tank except the bottom of the tank which is the last to freeze. Before this portion is ordinarily frozen, or frozen solid, the expansion of the ice already formed will exert tremendous pressure and force the then liquid in the bottom of the freezing tank through the necks 7 and 10 and under the respective plungers 8 and 9. At this point in the freezing and before the freezing tanks are completely filled with ice, or solid ice, and after the respective plungers 8 and 9 have been operated, the pivoted doors 36 and 37, as the case may be, are dropped to permit the completed cake of ice, which will be substantially regular and be only a little shorter than the full height of the respective freezing tanks 2 and 3, to drop out preferably, though not necessarily, upon a grid 38 located over the pit 5, any water or fluid being permitted to pass through the grid and down into the pit 5 where it is drained off in any suitable manner. At this time and immediately after the cake of ice is formed, the freezing liquid such as ammonia, if that be used, is cut off from the coils 20, 20 by any suitable means such as the valve 21. Should the cake of ice not readily drop out of the freezing tanks which are preferably formed with a tapered interior to permit of their ready removal, any suitable heating medium may be applied to the freezing tank to thaw the surface of the ice block so that it would readily drop out of its tank. This may be done in various ways. For purposes of illustration I have shown a steam pipe 39 provided with a valve 40 which is wrapped around the freezing tank 3 forming coils 41, 41 which alternate with the freezing coils 20, 20. A similar pipe 42 provided with a valve 43 is formed into coils 44, 44 which extend around the freezing tank 2 and alternate with the freezing coils 22, 22. While I preferably use steam for thawing the surface of the block of ice, if such thawing is necessary, it is, of course, to be understood that warm water or water at the ordinary temperature, may be passed through these coils in place of steam. It is further, of course, understood that the passage of the freezing fluid and the thawing fluid to their respective coils is done alternately. The coils through which the steam or hot water pass are so arranged that any liquid which may be in them would flow out by gravity before the freezing tank was again put in condition to form another block of ice and filled with the liquid to be frozen.

To prevent the stoppage of the passages 144 in the necks 7 and 10, respectively, I provide any suitable means for keeping the temperature of these necks above the freezing point. This may be done in various ways. By way of example I lead a branch 45 of the water main down and cause it to form coils 46 around the pipes 24 and 28, and then form the pipe 45 into coils 47 around the necks 7 and 10 so that there is a constant supply of water, at ordinary temperature, through the pipe 45, though this supply may be controlled as desired, by means of a valve 48. Or other means for heating the necks 7 and 10 may be used.

The doors 36 and 37 for closing the respective freezing tanks 3 and 2 may be held in their closed position by any suitable means. For purposes of illustration I have shown them pivoted at 49, their free end 50 taking over a sliding latch 51, which in turn may be controlled in any suitable manner. I have shown this latch provided with two pins 52, 52 between which an arm 53 of a bell crank 54 is mounted, the other end 55 of the pivoted bell crank lever being connected to a rod 56 which in turn is connected to the walking beam 12. While I have described merely one such latch 51 with its operating mechanism, it is, of course, to be understood that a similar one is used upon the freezing tank 3 to coöperate with the pivoted door 36 of that tank. The section on which the bottom of the freezing tank is shown eliminates this element from that view, but the mechanism on tank 3, is similar to that illustrated on the freezing tank 2. While this latch 51 may be operated by hand, it will be preferably operated automatically by the mechanism just described. The cake of ice is formed in the freezing tank and the tremendous expansion of freezing is used to operate the plungers 8 in the cylinders 6 and 9 to force up the respective end of the walking beam 12 to which they are connected; this will automatically operate the latch 51 and permit the pivoted doors 36 or 37, as the case may be, to drop down into the position shown by the door 37. It is clear that the upward pull on the rod 56 caused by the particular end of the walking beam ascending will rock the bell crank lever 54 which will cause the arm 53 to coöperate with the pins 52, 52 and withdraw the latch from engagement with the end 50 of the pivoted door 36 or 37.

The alternate rocking movement of the walking beam 12 may be transmitted and used to do work in any suitable manner. Preferably I convert this alternate rocking movement to continuous rotary movement in one direction by the use of any suitable and well known instrumentalities. On the standards 57 I mount the axle 58 upon which the walking beam 12 rocks. This walking beam is also provided with two oppositely arranged pivoted dogs 59 and 60 to engage with different ratchets. Upon this same shaft 58 I loosely mount the ratchet 61 connected to a gear wheel 62 which in turn is connected to an intermediate gear 63 (Fig. 2) which meshes with a gear 64 feathered on the drive shaft 65. The upward movement of the right hand arm of the walking beam 12 will cause the pivoted dog 59 carried by the walking beam to engage with its ratchet 61 and give a partial rotation to it and to the gear wheel 62 to which it is connected. This partial rotation of the gear wheel 62 will be transmitted to the power shaft 65 through the gears 63 and 64 in an obvious manner to rotate them in a direction indicated by the arrows (Fig. 2). Upon the same shaft 58 I loosely mount a second ratchet wheel 66 which is connected to a gear wheel 67 also loosely mounted upon the shaft 58, it being understood that the teeth of the ratchet 66 are reversed as compared with the teeth of the ratchet 61, and that they coöperate with the other and oppositely disposed pivoted dog 60 mounted on the other arm of the walking beam 12 (Fig. 3). An upward movement of that arm of the walking beam 12 will cause the pivoted pawl 60 to engage with the teeth of its ratchet 66 which in turn will give a partial rotation to the gear 67 and rotate the gear 68 which is secured to the driving shaft 65. It will be obvious from an inspection of Fig. 3 that the rotation of the driving shaft 65 is the same when operated by either of the ratchets 61 or 66, it, of course, being understood that they operate alternately.

It will therefore be seen that by my invention I not only obtain all the advantages of a freezing machine and one which can commercially freeze cakes of ice, but I also use the tremendous expanding force of water, or other liquid, as it freezes and transmit this energy to do any desired work. It will be obvious that the drive shaft 65 will be rotated step by step, at slow speed, but with tremendous force, and that any suitable work may be connected to this driving shaft 65 so that this energy may be transmitted.

Having thus described this invention in connection with an illustrative embodiment thereof to the details of which I do not desire to be limited, what is claimed as new and what it is desired to secure by Letters Patent is set forth in the appended claims:

1. The method of transmitting the expansible force of a freezing liquid, consisting of freezing a liquid in a closed retainer having a movable surface to be actuated by the freezing of the liquid, controlling the movement of the movable surface so that as it is moved by the expansible force of the liquid freezing it will do work, removing the frozen liquid and again filling the closed retainer with liquid to be frozen and removed in its turn.

2. The method of transmitting the expansible power of freezing liquids, consisting in alternately filling a plurality of closed receptacles provided with plungers or movable members, and alternately freezing the liquids in the receptacles to alternately actuate the different plungers or movable members by the expansible force of the liquid in freezing, transmitting the movement of the different plungers or movable members to do work and alternately removing the frozen liquid and filling the receptacles with new liquid to be frozen and removed in its turn.

3. The method of freezing water and transmitting the expansible force of the at freezing consisting in feeding the water at substantially its greatest density into freezing containers, freezing the water, transmitting the expansible force of the water freezing to do work and removing the ice to permit the containers to be again filled with fresh water to be frozen and removed.

4. The method of freezing water and transmitting the expansible force of the water at freezing, consisting in chilling the water and bringing it to substantially 39-2/10 degrees, then feeding it at substantially this temperature to the freezing container then transmitting the expansible force of the water at freezing to do work and removing the ice to permit the containers to be again filled with fresh water to be frozen and removed.

JAMES P. POOL.

Witnesses:
ALAN M. JOHNSON,
ROSE MENK.